(12) United States Patent
Fehrenbach

(10) Patent No.: US 6,851,313 B2
(45) Date of Patent: Feb. 8, 2005

(54) VIBRATORY LEVEL SENSOR

(75) Inventor: Josef Fehrenbach, Haslach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 10/214,741

(22) Filed: Aug. 9, 2002

(65) Prior Publication Data

US 2003/0140695 A1 Jul. 31, 2003

(30) Foreign Application Priority Data

Jan. 28, 2002 (DE) .......................................... 102 03 461

(51) Int. Cl.⁷ .............................................. G01F 23/00
(52) U.S. Cl. ................................. 73/290 V; 73/290 R
(58) Field of Search ............................ 73/290 R, 290 V

(56) References Cited

U.S. PATENT DOCUMENTS

| | | | |
|---|---|---|---|
| 3,625,058 A | 12/1971 | Endress et al. ........... 73/290 V |
| 3,960,004 A | * 6/1976 | Writ et al. .................... 73/67.1 |
| 4,226,118 A | * 10/1980 | Aldrich ..................... 73/290 V |
| 4,589,281 A | * 5/1986 | Aldrich ..................... 73/290 R |
| 4,594,584 A | 6/1986 | Pfeiffer et al. .............. 340/620 |
| 5,828,573 A | * 10/1998 | Hayashi ................. 364/468.28 |
| 5,966,983 A | * 10/1999 | Pfeiffer et al. ................ 73/291 |
| 6,205,855 B1 | * 3/2001 | Pfeiffer ..................... 73/290 V |

FOREIGN PATENT DOCUMENTS

| | | |
|---|---|---|
| DE | 1 773 815 | 2/1972 |
| DE | 30 44 354 | 6/1982 |
| DE | 38 10 669 | 10/1989 |
| DE | 40 08 135 | 9/1991 |
| DE | 197 20 519 C2 | 11/1998 |
| DE | 695 12 652 | 4/2000 |
| EP | 0 123 189 | 10/1984 |
| EP | 0 985 916 A1 | 3/2000 |
| EP | 0 985 917 A1 | 3/2000 |

* cited by examiner

Primary Examiner—Hezron Williams
Assistant Examiner—Rodney Frank
(74) Attorney, Agent, or Firm—Nath & Associates PLLC; Gary M. Nath; Marvin C. Berkowitz

(57) ABSTRACT

The invention pertains to a method for determining and/or monitoring a predetermined level of a material in a container by means of a probe in the form of a vibrating rod that protrudes into the interior of the container and forms part of an electromechanical oscillating system. According to the invention, one or more characteristic parameters are measured after excitation of the system, where these parameters are taken into consideration in the evaluation of the measurement.

7 Claims, 5 Drawing Sheets

VIBRATORY LEVEL SENSOR

FIELD OF THE INVENTION

The invention pertains to a method for determining and/or monitoring a predetermined level of a material in a container according to the characteristics of the preamble of claim 1.

BACKGROUND OF THE INVENTION

A level sensor for detecting a predetermined level is known from DE 3348119 C2. This sensor contains a probe in the form of a vibrating rod that protrudes into the container and is excited to vibrate by an electric excitation device. The frequency of the vibration depends on the level in the container. A vibratory system that is usually referred to as an oscillator is realized by amplifying and feeding back the electrically detected mechanical vibration signal to the excitation input.

Similar methods and devices are described, for example, in DE 19720519 C2, EP 0985916 A1 and EP 0985917 A1. In all the aforementioned publications, the described vibratory level sensor contains, in principle, an electromechanical system that is excited to continuously self-oscillate. Various options that differ with respect to the design of the mechanical vibratory element, the electromechanical converter system and the electrical design of the oscillator are known for realizing an oscillator of this type.

It is preferred to utilize at least two vibrating rods that are either arranged coaxially or parallel to one another as the mechanical vibratory element.

This vibrational mechanical system is usually driven electromechanically by a piezo-element that is excited with an AC voltage, where a piezo-element is also used for detecting and reconverting the mechanical vibration into electrical vibration. In this case, the driving device and the detecting device can be divided into two separate piezo-elements, into two separate regions of one piezo-element or both functions can be combined in one piezo-element.

If separate driving and detecting elements are provided, the entire electromechanical vibratory system could also be interpreted as an electric quadrupole network that transmits a voltage applied to the two input poles to the two output poles with an amplitude and phase shift that depend on frequency. The transmission characteristics of this quadrupole network are comparable to those of an electronic resonant circuit.

A single piezo-element that is used for driving and detecting purposes usually contains two connections. This is the reason such a piezo-element can also be interpreted as an electric dipole network. Electric dipole networks are generally characterized by their impedance, which may be dependent on frequency.

In this context, it should also be noted that a single piezo-element which can also be interpreted as an electric dipole network is able to simulate the characteristics of an electric quadrupole network if it operates in accordance with the time-division multiplex mode, i.e., if the driving and the detection function are periodically changed over at the connection poles.

Conventional electric oscillators can be realized with the described oscillating systems that should be interpreted as electric dipole networks or quadrupole networks. An oscillator always contains amplifying and feedback devices, of which at least one should be frequency-selective. Preferred embodiments of oscillators contain, for example, a frequency-selective quadrupole network that should be interpreted as an electronic resonant circuit in the feedback loop of the feedback amplifier circuit.

Other embodiments of oscillators are characterized by a feedback amplifier in which the amplification is dependent on the oscillatory system that should be interpreted as an electric dipole network. The amplification of the thereby formed frequency-selective amplifier is dependent on the impedance of the dipole network that characterizes the vibratory structure.

A problem with all these vibratory level sensors is that the oscillator must be designed such that a reliable stimulation of the oscillations and a continuous vibration of the oscillator are ensured under all operating conditions. For example, if the sensor is immersed in the material, the attenuation of the vibratory system is increased such that its natural frequency and phase shift change. This causes the feedback or amplification characteristic of the oscillator to be subjected to more less intense fluctuations. In order to ensure reliable vibration of the oscillator under all occurring operating conditions of the electromechanical vibratory element, complicated and expensive circuit arrangements and/or constructive measures are frequently required. In addition, the vibratory elements that should be interpreted as dipole network or quadrupole network transmission elements may have similar characteristics at different frequency points that occasionally may lie relatively far apart from one another. If this makes it possible to fulfill the vibratory requirements of the oscillator for different frequencies, the system oscillates rather randomly at one or the other frequency and thus makes it impossible to determine the filling state of the container. This means that expensive measures are also required here in order to ensure that the system always oscillates at the defined, desired frequency and reliable information concerning whether a certain level has been exceeded or not reached can be obtained.

SUMMARY OF THE INVENTION

The present invention is based on the objective of disclosing a method that makes it possible to reliably and inexpensively detect level limits by means of an oscillating sensor that protrudes into the container.

This objective is attained with a method that is characterized by exciting the vibratory system, measuring one or more characteristic parameters of the reaction of the system to the excitation and evaluating these parameters.

In the simplest instance, this is realized by determining and evaluating the electric transmission characteristics of a vibratory system that should be interpreted as a quadrupole network or the impedance of a vibratory element that is operated as a dipole network. This is preferably carried out over a certain frequency range in which the transmission characteristics and the impedance have characteristic properties that make it possible to unequivocally deduce the filling status.

In a first preferred embodiment, the vibratory system is excited at different frequencies, and the reaction of the system is measured at all frequencies. In order to realize an excitation at different frequencies, it is possible to successively adjust a certain number of discrete frequency points and to periodically repeat this frequency sequence. Alternatively, it would also be possible to continuously sweep the frequency range. This procedure is known as wobbling.

In vibratory systems that should be designated as quadrupole networks, the frequency-dependent ratio between the output amplitude and the excitation amplitude and/or between the output phase and the input phase of the AC voltage can be measured and evaluated. In vibratory systems that are operated as dipole networks, a series circuit is formed from a known impedance and the impedance of the dipole network circuit which needs to be evaluated, wherein an input or excitation voltage of variable frequency is supplied via this series circuit. Frequency-dependent parameters of the dipole network impedance can be determined and evaluated by measuring the ratio between the voltage over the entire series circuit and the voltage over the dipole network and, if applicable, by measuring the phase shift between these voltages.

In a second preferred embodiment, the vibratory system is periodically excited in a pulsed or stepped fashion. After the end of the limited and usually very short excitation, the reaction of the electromechanical system is measured and evaluated. This reaction usually consists of a decaying mechanical or electric vibration that can be measured by the electromechanical converter. This makes it possible to measure the parameters initial amplitude, frequency and decay time constant, wherein information concerning whether the level sensor is immersed in the material or not can be derived from these parameters.

In a third preferred embodiment, a noise voltage of usually limited bandwidth or so-called pink noise is applied at the input side of an oscillating system that is preferably realized in the form of a quadrupole network. In this case, an electronic signal that now only contains certain frequency components is measured at the output as the reaction to the excitation. Most frequency portions of the broadband excitation signal are filtered out by the electromechanical oscillating system. The output signal is preferably evaluated with respect to the frequency range, for example, by means of filter banks. It would be even easier to carry out a Fourier transform of the signal from the time domain into the frequency domain. However, this would make it necessary to digitize the continuous voltage signal and to carry out a fast Fourier transform (FFT). The output amplitudes that are plotted as a function of frequency make it possible to obtain information regarding the instantaneous transmission characteristics of the vibratory system and consequently regarding whether or not the vibratory element of the sensor is covered with material.

BRIEF DESCRIPTION OF THE DRAWINGS

The invention is described in greater detail below with reference to embodiments that are illustrated in the drawings. Shown are.

DETAILED DESCRIPTION

Figure 1:
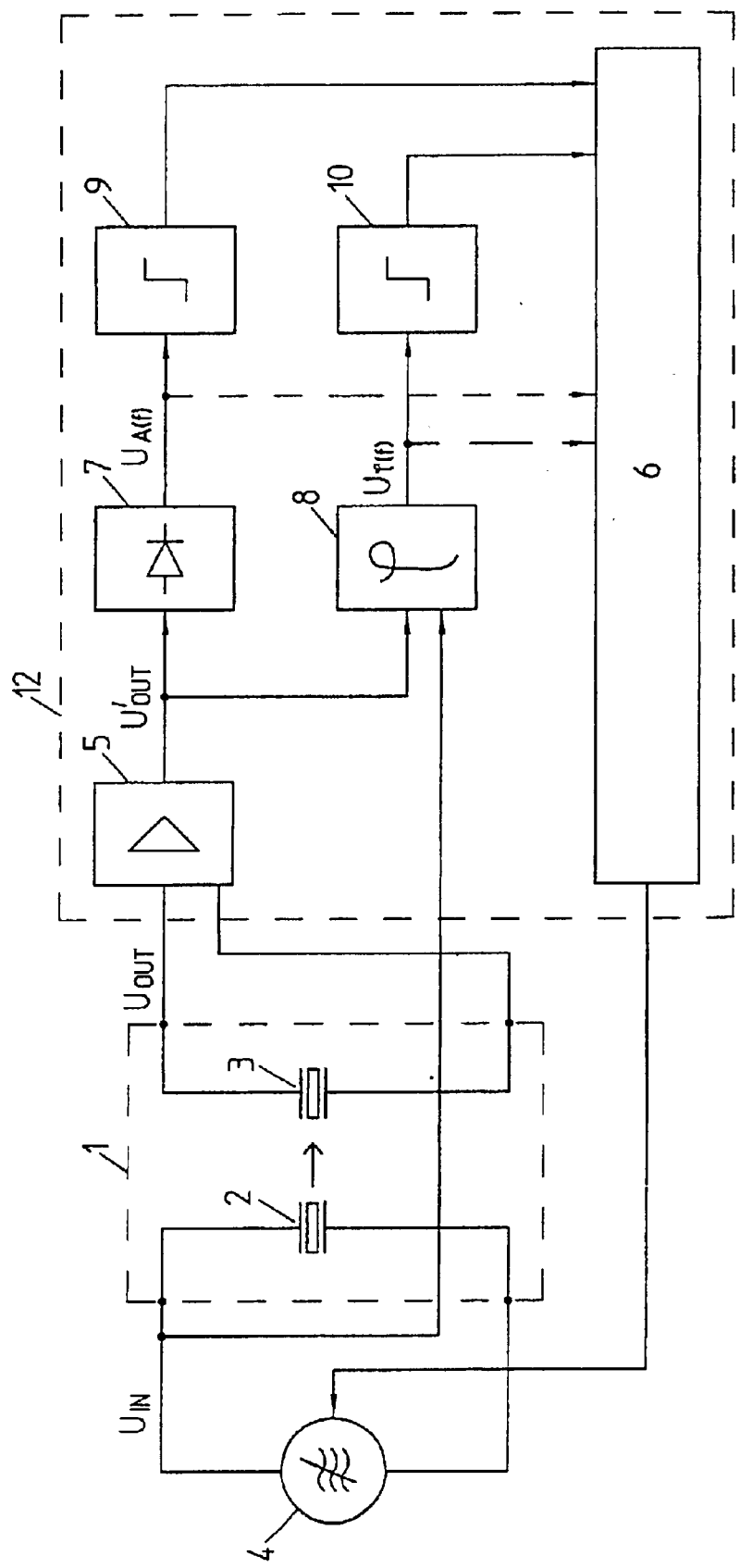
FIG. 1, a first embodiment of a circuit arrangement for carrying out the method according to the invention that was described above in connection with frequency wobbling.

An electromechanical oscillating system 1 that contains separate excitation and detection elements 2, 3 and should be interpreted as an electrical quadrupole network is excited at the input poles with the voltage $U_{IN}$ of the AC voltage source 4. The mechanical vibratory element, which is realized in the form of a turning fork, e.g., and protrudes into the container is not explicitly shown in the figure. In this case, only the effect of the vibratory element as a coupling between the electromechanical vibratory elements 2, 3 is indicated in the form of an arrow. The voltage $U_{OUT}$ at the output of the quadrupole network is amplified by the amplifier 5.

The control, evaluation and output unit 6 continuously changes the frequency of the AC voltage source 4, which here is also referred to as a voltage-controlled oscillator VCO, over a certain range. The amplified output voltage $U_{out}$ must be evaluated in order to obtain information on the operating state of the quadrupole network 1, i.e., concerning whether the level sensor is covered by the material or not. The amplitude A and the phase ϕ can be respectively evaluated in relation to the input voltage $U_{IN}$. The curve of the amplitude and/or phase angle difference over the wobble time, which is equivalent to the frequency, is characteristically dependent on whether or not the sensor is covered by the material. Time-dependent and frequency-dependent voltages $U_A(t)$ and $U_A(f)$, $U_\phi(t)$ and $U_\phi(f)$ are respectively obtained by feeding the output voltage $U_{OUT}'$ to an amplitude detector 7, which, for example, rectifies and smooths the AC voltage and to a phase detector 8 together with the input voltage $U_{IN}$. Switching edges that can be evaluated by the control, evaluation and output unit 6 are generated by comparators 9, 10 at the time/frequency point at which certain voltage values that characterize certain amplitude and/or phase angle differences are exceeded or not reached. This evaluation results in frequency values at which the amplitude and/or phase angle profile of the quadrupole network shows extreme values or strong changes. These frequency values make it possible to unequivocally deduce whether or not the sensor is covered with material.

Figure 2:
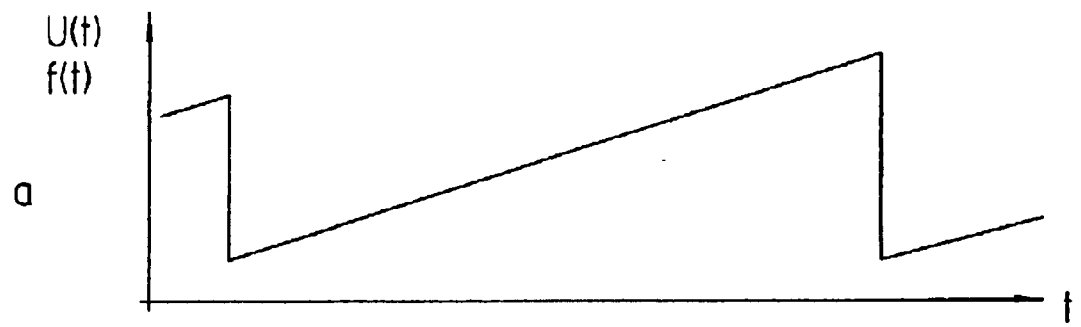
FIG. 2, signal waveforms of the circuit arrangement according to FIG. 1.
Figure 2:
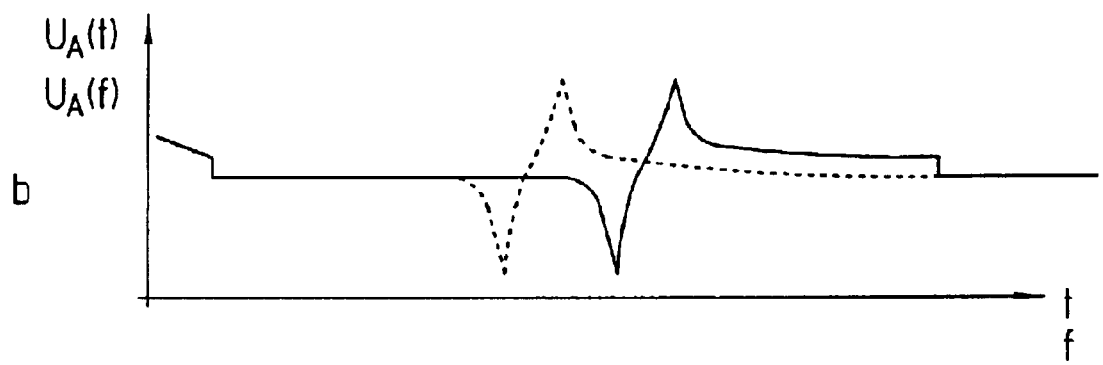
Figure 2:
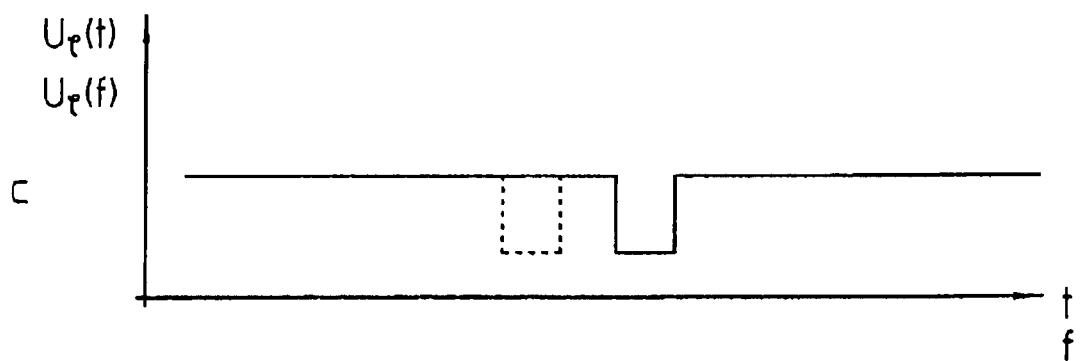

FIG. 2 shows examples of signal waveforms at circuit points of the circuit according to FIG. 1. In diagram 2a, the voltage waveform of the control voltage of the VCO 4 is plotted as a function of time. Under the prerequisite of a linear correlation between the control voltage and frequency, the linear, sawtooth-shaped rise also represents the frequency rise of the excitation voltage $U_{IN}$ as a function of time.

In diagram 2b, the amplitude of the respective output voltages $U_{OUT}$ and $U_{OUT}'$ is respectively plotted as a function of time t and frequency f. Since the time and frequency are linearly related according to diagram a, the time and frequency axes are proportional to one another for one frequency sweep. The amplitude voltage at the output of the detector which is respectively designated as $U_A(t)$ and $U_A(f)$ shows characteristic extreme values that shift when the sensor is immersed in the material. In this case, the continuously drawn curve identifies the profile when the sensor freely vibrates in air, and the curve drawn with broken lines identifies a vibratory element that is immersed, for example, in water. Diagram 2c analogously shows the phase progression of the output voltage $U_{OUT}'$ referred to $U_{IN}$ which, according to FIG. 1, is respectively designated as $U_\phi(t)$ and $U_{z,901}(f)$ and generated by the phase detector 8. In addition, comparator thresholds of the comparators 9, 10 are respectively shown in both diagrams 2b and 2c, where said thresholds cause a switching signal to be generated at locations at which intense signal changes occur. The time position and the frequency position of the switching signal result, for example, in the resonant frequencies f1 and f2 which are characteristic for vibration in air and vibration in the immersed state.

In one variant of the device according to FIG. 1, the comparators 9, 10 are eliminated and the respective voltages $U_A(f)$ and $U_\phi(f)$ are directly fed to the control, evaluation and output unit 6 as indicated by broken lines. This unit may contain for example, a microcontroller with integrated analog/digital and digital/analog converters. Consequently, the microcontroller is able to simultaneously generate discrete time control voltage values for the VCO 4 via the D/A converter and to convert into digital values and store the system response in the form of the amplitude $U_A(f)$ and the phase angle difference $U_\phi(f)$. The stored data set for a single frequency sweep can be analyzed with respect to extreme values and intense changes with known mathematical methods. Information on the state of immersion of the sensor element is determined from the obtained characteristic signal properties, with this information being conventionally output in the form of an empty message or a full message.

Another option that is not illustrated in FIG. 1 consists of also eliminating the two detectors 7 and 8. In this case, the input and output voltages $U_{IN}$ and $U_{OUT}'$ are directly digitized, and the amplitude and phase evaluation is also carried out digitally in the microcontroller.

In another advantageous additional development that is also not illustrated in FIG. 1, the respective output voltages $U_{OUT}$ and $U_{OUT}'$ are subjected to a narrow-band filtering process. The bandpass filter used for this purpose is set to the frequency adjusted by means of the VCO 4 and consequently allows only a narrow frequency range that corresponds to the excitation frequency to pass. Thus, all interference frequencies are effectively suppressed. The required variable-frequency bandpass filter can either be realized with discrete components or, in case $U_{IN}$ and $U_{OUT}^{()}$ are directly digitized, in the form of a program sequence of the microcontroller.

Due to the relatively high quality of the electromechanical oscillating system 1, the response of the system to an excitation occurs with a relatively long delay. This means that the frequency sweep must be carried out correspondingly slow in order to exactly determine the transmission characteristics of the quadrupole network 1 as a function of frequency. However, if the sensor is to react rapidly to a filling or emptying process, it is not absolutely imperative to determine exactly the transmission characteristics of the quadrupole network. Since a significant difference in frequency usually exists between the resonance of a freely vibrating sensor and that of an immersed sensor, it is sufficient to carry out a fast frequency sweep in which the position of the extreme values can still be unequivocally detected despite the reduced amplitude and despite the fact that the system is not able to oscillate to the full output amplitude during the excitation. The resonant frequency can be adequately determined from the phase profile despite the rapid wobbling because the phase angle difference changes rather abruptly by 180° in this point. This intense change also manifests itself if the wobbling over the frequency range is carried out faster than the permissible speed for an exact measurement. If the point of resonance is determined rapidly, but relatively inaccurately in this fashion, the frequency range of the wobbling can be significantly reduced to the vicinity of the point of resonance such that the wobbling speed can be reduced again and the accuracy in determining the transmission function is increased. If the point of resonance suddenly disappears from the monitored frequency window, the sensor output is able to immediately change from "empty" to "full" and vice versa, and a subsequent fast frequency sweep either verifies that the point of resonance was shifted with respect to its frequency, or the lack of the point of resonance indicates a sensor defect that can be immediately displayed.

Figure 3:
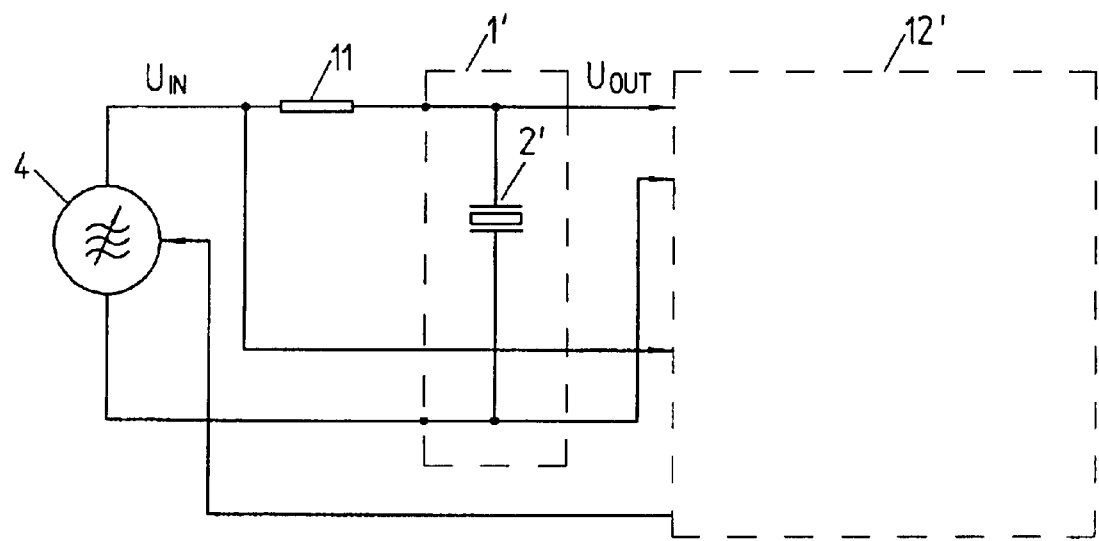
FIG. 3, a second embodiment of a circuit arrangement according to the invention.

The device shown in FIG. 3 differs from the previously described device according to FIG. 1 due to the fact that this oscillating system should be interpreted as a dipole network because only one electromechanical transducer 2' is used for the excitation and the detection. In this case, the impedance of the dipole network 1' is determined instead of determining the transmission characteristics of a quadrupole network 1. For this purpose, the AC voltage $U_{IN}$ generated by the VCO 4 excites a series circuit consisting of a known impedance 11 and the impedance of the dipole network 1' which is to be determined. Information on the impedance characteristics of the dipole network 1' as a function of frequency can be obtained by determining the amplitude relations between $U_{IN}$ and $U_{OUT}$ and/or the phase angle difference between the two voltages, with the operating state of the sensor being derived from these impedance characteristics. The electronics unit 12' of this device may correspond to the electronics unit 12 according to FIG. 1. Consequently, the previous description of the device according to FIG. 1 applies analogously to this circuit arrangement.

Figure 4:
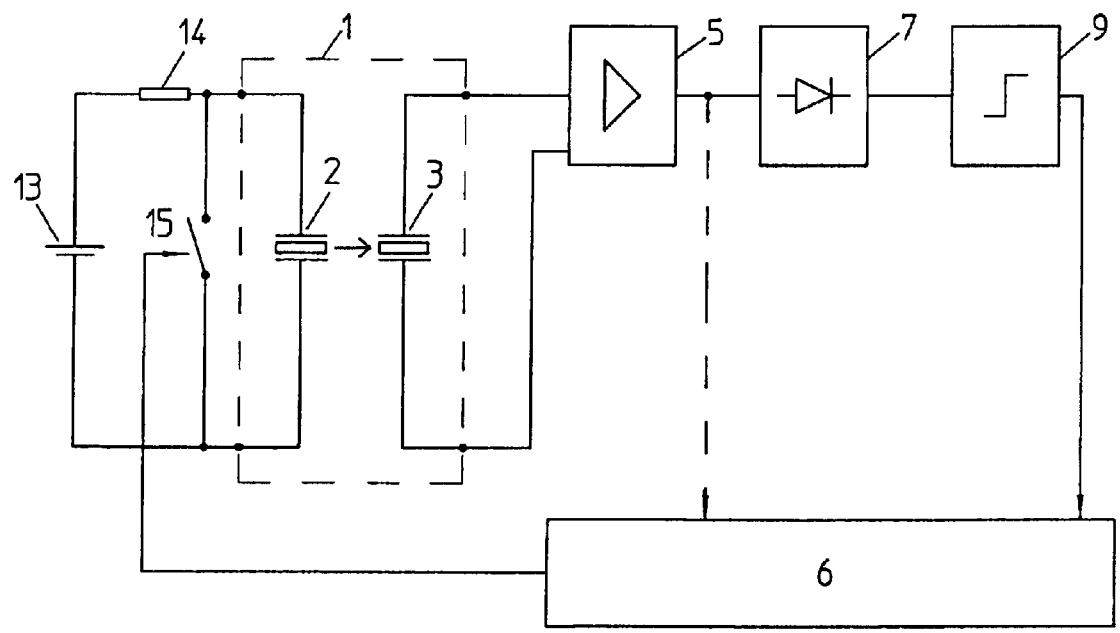
FIG. 4, a third embodiment of a circuit arrangement according to the invention.
Figure 5:
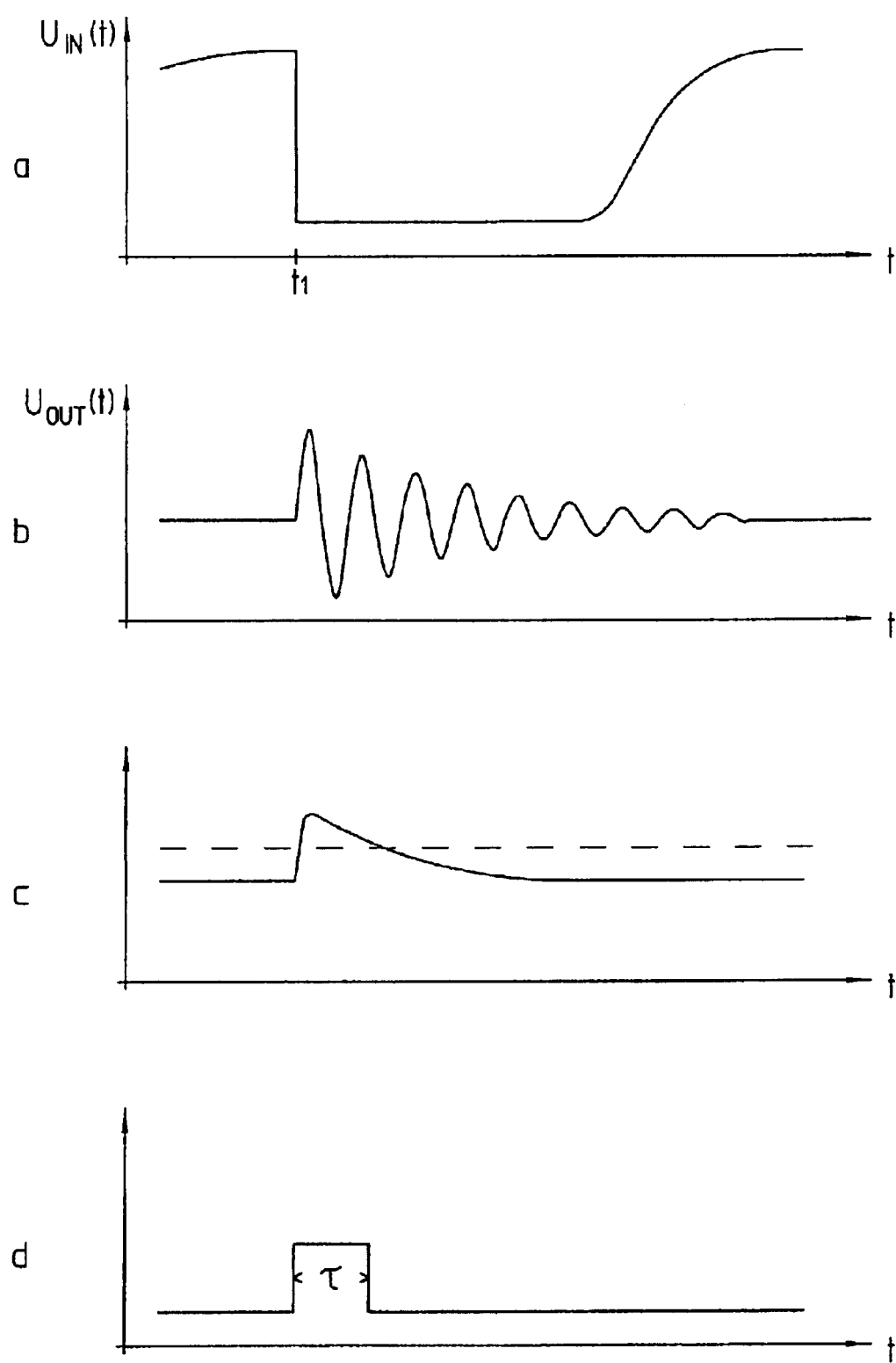
FIG. 5, signal waveforms of the circuit arrangement according to FIG. 4.

FIG. 4, in principle, differs from FIG. 1 only in the type of excitation of the vibratory system. In this case, the oscillating system is excited by an electric impulse instead of carrying out a continuous or discrete frequency wobbling. This electric impulse is realized in the form of a voltage surge or a short voltage pulse. In FIG. 4, this is realized with the DC voltage source 13, the resistor 14 and the switch 15. When the switch 15 is open, the voltage source 13 charges the electromechanical converter 2 to a certain voltage (see FIG. 5a) via the resistor 14. At time t1, the switch is closed by the control, evaluation and output unit 6 such that the electromechanical vibratory system, which is illustrated in the form of the quadrupole network 1, is excited to self-oscillate. An attenuated oscillation results at the output of the quadrupole network, as schematically indicated in FIG. 5b. For example, an attenuation time τ that is characteristic of whether the sensor element is immersed or not (see FIG. 5d) can be determined by means of amplification, amplitude detection (see FIG. 5c) and comparison with the comparator response threshold. The frequency of the decaying self-oscillation and the maximum amplitude can be additionally or alternatively evaluated. A person skilled in the art is familiar with the corresponding methods, so that they need not be described in greater detail. From a technical standpoint, this electric "knocking" of the mechanical oscillating system means a broadband frequency excitation, to which the system reacts with filtering.

Figure 6:
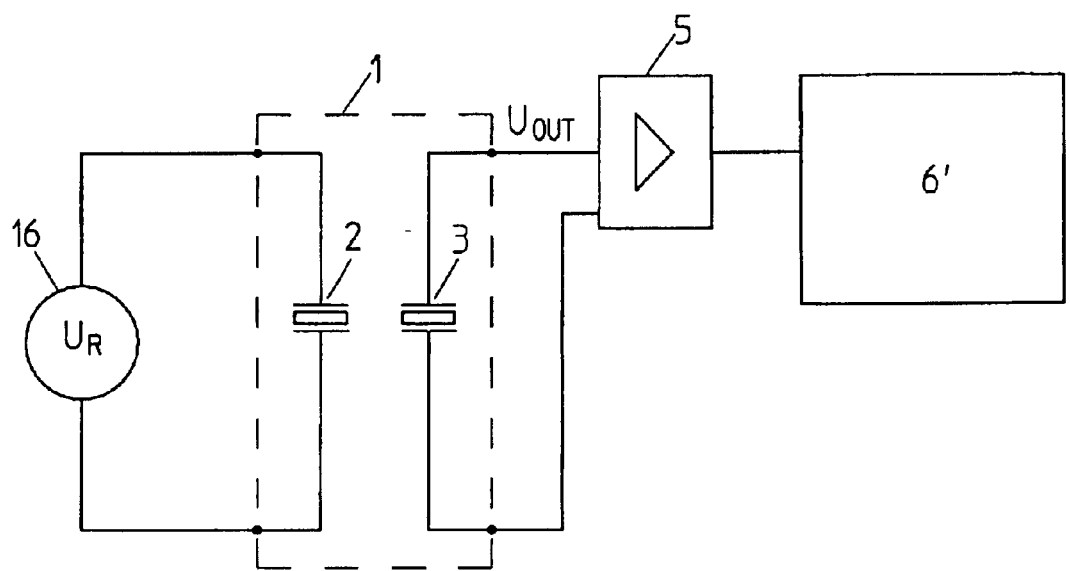
FIG. 6, a fourth embodiment of a circuit arrangement according to the invention, and FIG. 7, signal waveforms of the circuit arrangement according to FIG. 6.
Figure 7:
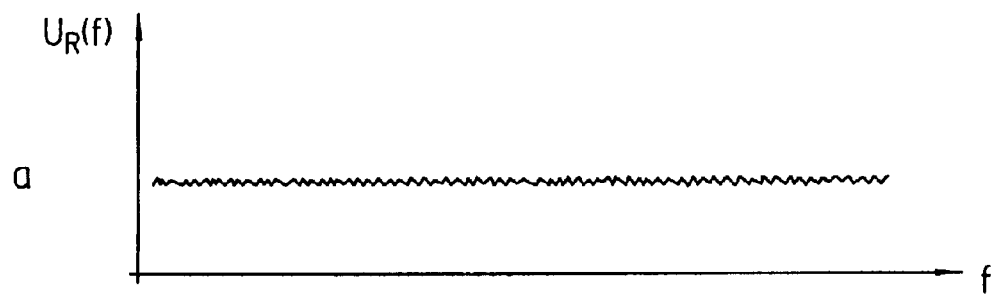
Figure 7:
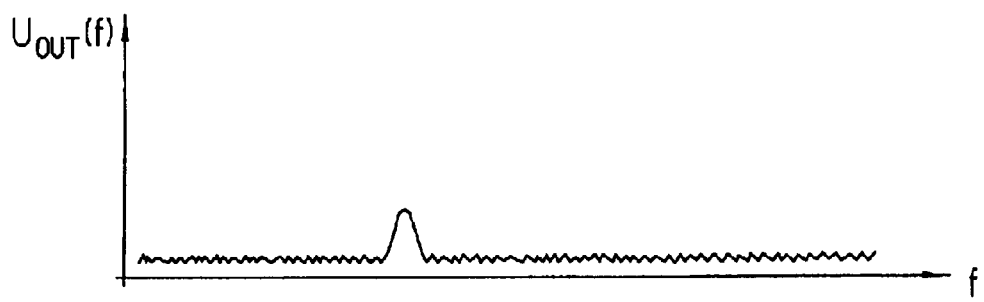

The variant of the method which is illustrated in FIG. 6 is also based on this principle. In contrast to FIG. 4, the broadband frequency excitation is realized with a noise source 16. According to FIG. 7a, this noise source generates uniform noise over the frequency of interest, to which the electromechanical vibratory system can respond. Only a small frequency portion of the original excitation spectrum occurs at the output of the quadrupole network 1. The level limit can be detected by means of this sensor as described above by determining the frequency of this portion, which is illustrated in FIG. 7b, in the form of the voltage plotted as a function of frequency. This frequency evaluation of the output signal can be realized in the control, evaluation and output unit 6', for example, by means of adjustable narrow-band bandpass filters or, as proposed in the preferred embodiment, in the form of a transformation of the time signal into the frequency domain by means of a fast Fourier transform (FFT).

What is claimed is:

1. Method for determining and/or monitoring a predetermined level of a material in a container by means of a probe in the form of a vibrating rod that protrudes into the interior of the container and forms part of an electromechanical vibratory system, characterized by the fact that, the vibratory system is excited with different frequencies during the step of determining and/or monitoring a predetermined level of a material, and by the fact that the reaction of the system is measured at all frequencies, after excitation of the vibratory system, one or more characteristic parameters are measured, and by the fact that this/these parameter(s) is/are taken into consideration in the evaluation of the measurement.

2. Method according to claim 1, characterized by the fact that the parameter (n) to be determined and evaluated respectively consists of the electric transmission characteristics of a vibratory system that should be interpreted as a quadrupole network or of the impedance of an oscillating system that is operated as a dipole network.

3. Method according to claim 2, characterized by the fact that the transmission characteristics and the impedance respectively have characteristic properties that make it possible to unequivocally deduce the filling status, with said properties being determined and evaluated.

4. Method according to claim 1, characterized by the fact that the excitation takes place with different frequencies, wherein a certain number of discrete frequency points are successively adjusted and this frequency sweep is periodically repeated.

5. Method according to claim 1, characterized by the fact that a predetermined frequency range is continuously swept (wobbling).

6. Method according to claim 1, characterized by the fact that the oscillating system is interpreted as a quadrupole network, and by the fact that the frequency-dependent ratio between the output amplitude and the excitation amplitude and/or the ratio between the output phase and the input phase of the electric AC voltage is respectively measured and evaluated.

7. Method according to claim 1, characterized by the fact that the oscillating system is operated as a dipole network, and by the fact that a series circuit is formed from a known impedance and the impedance of the dipole network which is to be analyzed, wherein an input or excitation voltage of variable frequency is supplied via said series circuit, and wherein frequency-dependent parameters of the dipole network impedance are determined and evaluated by measuring the ratio between the voltage over the entire series circuit and the voltage over the dipole network and, if applicable, by measuring the phase shift of these voltages.

* * * * *